US012643319B2

(12) United States Patent
Jennings et al.

(10) Patent No.: US 12,643,319 B2
(45) Date of Patent: Jun. 2, 2026

(54) MAINTAINING RAW FLEXIBLE PLATE INTEGRITY USING PRE-HARDENED FLEXIBLE PLATE REGIONS

(71) Applicant: DuPont Electronics, Inc., Wilmington, DE (US)

(72) Inventors: Lewis B. Jennings, Elkton, MD (US); Peter J. Fronczkiewicz, Lake Wylie, SC (US)

(73) Assignee: SP HOLDING II ET, INC., Wilmington, DE (US)

( * ) Notice: Subject to any disclaimer, the term of this patent is extended or adjusted under 35 U.S.C. 154(b) by 70 days.

(21) Appl. No.: 18/664,700

(22) Filed: May 15, 2024

(65) Prior Publication Data

US 2025/0353291 A1 Nov. 20, 2025

(51) Int. Cl.
*B41F 1/38* (2006.01)
*B41F 5/24* (2006.01)

(52) U.S. Cl.
CPC . *B41F 5/24* (2013.01); *B41F 1/38* (2013.01)

(58) Field of Classification Search
CPC .................................... B41F 5/24; B41F 1/38
See application file for complete search history.

(56) References Cited

U.S. PATENT DOCUMENTS

2013/0340637 A1 12/2013 Wolterink et al.
2014/0069581 A1* 3/2014 Ogawa .................... G02B 1/14 156/275.5
2020/0348546 A1* 11/2020 Chen .................... G02F 1/1679
2020/0402963 A1* 12/2020 Lin ........................ H10K 59/38
2023/0350298 A1* 11/2023 Fohrenkamm .......... G03F 7/325
2023/0367222 A1 11/2023 Lenssens et al.

FOREIGN PATENT DOCUMENTS

JP 2022119359 A 8/2022

OTHER PUBLICATIONS

International Search Report and Written Opinion for the corresponding International Application No. PCT/US2025/028825, International Filing Date: May 12, 2025, Date of Mailing: Oct. 10, 2025; 10 pages.

* cited by examiner

*Primary Examiner* — David H Banh

(74) *Attorney, Agent, or Firm* — CANTOR COLBURN LLP

(57) ABSTRACT

Embodiments of the invention are directed to a component of a flexographic printing system. The component includes an electromagnetic energy source operable to electronically couple to a controller. The electromagnetic energy source is further operable to apply a pre-hardening process to a non-print region of a raw flexible plate. The pre-hardening process results in a pre-hardened region of the non-print region of the raw flexible plate. The pre-hardened region of the non-print region of the raw flexible plate counters a clamping force applied to the non-print region of the raw flexible plate.

20 Claims, 17 Drawing Sheets

MAINTAINING RAW FLEXIBLE PLATE INTEGRITY USING PRE-HARDENED FLEXIBLE PLATE REGIONS

BACKGROUND

The present invention relates in general to flexographic printing systems operable to use a flexible plate to transfer ink to a substrate. More specifically, the present invention relates to structures and methods operable to enhance the physical integrity of selected region(s) of a raw flexible plate by providing pre-hardened flexible plate regions.

Flexography is a printing technique used for printing designs, images, text, artwork, and other visual information onto plastic films, paper, corrugated boards, and fabrics. Flexography, which is often referred to as flexographic printing, uses a flexible plate made from soft elastomeric polymers or rubber. A raised image of the design to be printed is formed in/on the flexible plate, which is wrapped around a cylinder and subsequently coated with ink. Each flexible plate applies a different colored ink, such as magenta, yellow, black, or cyan. During printing, the flexible plate comes in contact with the ink and produces print on the desired surface.

SUMMARY

Embodiments of the invention are directed to a component of a flexographic printing system. The component includes an electromagnetic energy source operable to electronically couple to a controller. The electromagnetic energy source is further operable to apply a pre-hardening process to a non-print region of a raw flexible plate. The pre-hardening process results in a pre-hardened region of the non-print region of the raw flexible plate. The pre-hardened region of the non-print region of the raw flexible plate counters a clamping force applied to the non-print region of the raw flexible plate.

In addition to any one or more of the features described herein, the pre-hardening process converts at least a portion of the non-print region to the pre-hardened non-print region.

In addition to any one or more of the features described herein, the pre-hardening process converts the at least a portion of the non-print region to the pre-hardened non-print region without substantially changing a print region of the raw flexible plate.

In addition to any one or more of the features described herein, the pre-hardened non-print region includes an exposed edge sidewall.

In addition to any one or more of the features described herein, the clamping force is insufficient to cause the exposed edge sidewall of the pre-hardened non-print region to substantially bulge.

In addition to any one or more of the features described herein, the print region includes a first region of a photopolymer material.

In addition to any one or more of the features described herein, the non-print region includes a second region of the photopolymer material.

In addition to any one or more of the features described herein, the pre-hardening process includes a curing process.

In addition to any one or more of the features described herein, the curing process includes an ultraviolet (UV) electromagnetic radiation curing process.

Embodiments of the invention are further directed to methods of forming and using the above-described component of the flexographic printing system.

Embodiments of the invention are further directed to a flexible plate including a print region, a non-print region having an exposed edge sidewall, and an electromagnetic energy source.

In addition to any one or more of the features described herein, the electromagnetic energy source is operable to, responsive to instructions from a controller, convert at least a portion of the non-print region to a pre-hardened non-print region by applying a pre-hardening process to the exposed edge sidewall.

In addition to any one or more of the features described herein, the print region includes a first region of a photopolymer material; the non-print region includes a second region of a photopolymer material; the electromagnetic energy includes ultraviolet (UV) light; and the pre-hardening process includes activating the UV light energy source.

Embodiments of the invention are further directed to methods of forming and using the above-described flexible plate.

Additional features and advantages are realized through the techniques described herein. Other embodiments and aspects are described in detail herein. For a better understanding, refer to the description and to the drawings.

BRIEF DESCRIPTION OF THE DRAWINGS

The subject matter which is regarded as the present invention is particularly pointed out and distinctly claimed in the claims at the conclusion of the specification. The foregoing and other features and advantages are apparent from the following detailed description taken in conjunction with the accompanying drawings in which:

Figure 1:
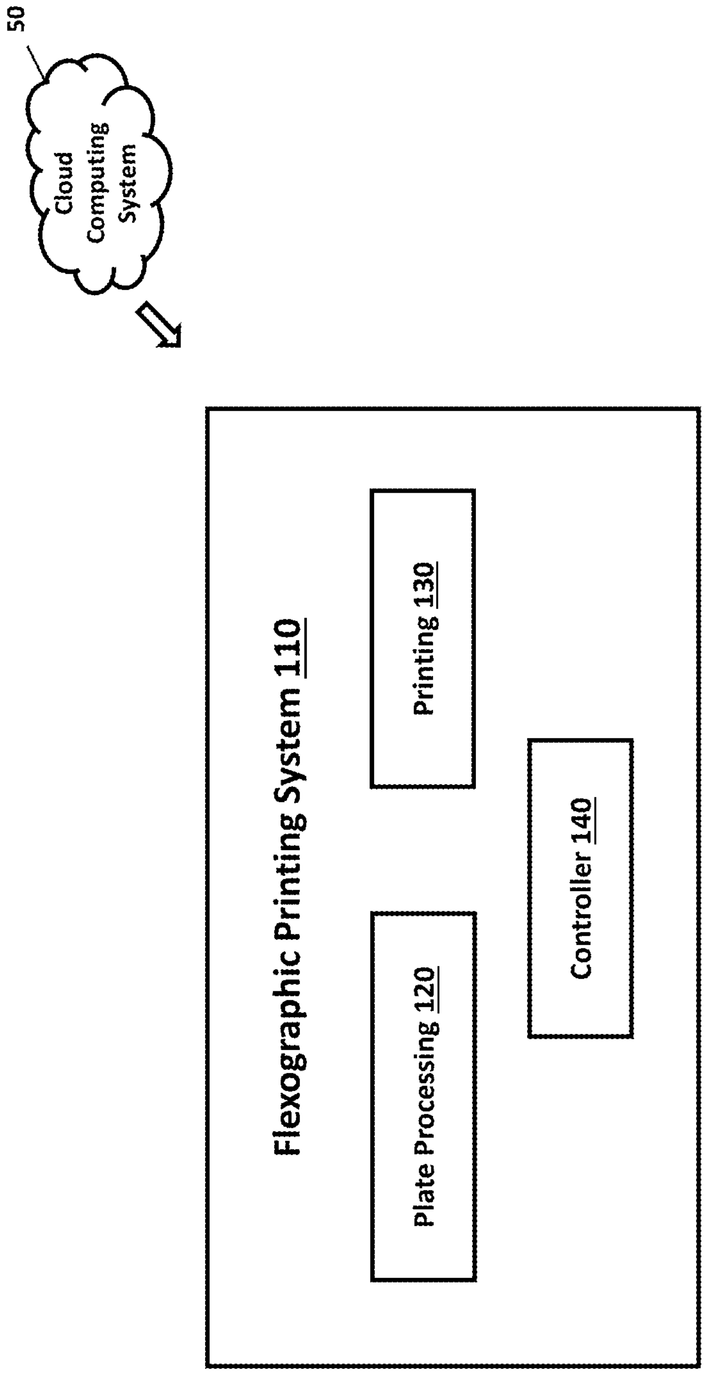
FIG. 1 depicts a simplified block diagram of a printing system in accordance with embodiments of the invention.

In the accompanying figures and following detailed description of the disclosed embodiments, the various elements illustrated in the figures are provided with two, three, or four digit reference numbers. In most instances, the leftmost digit(s) of each reference number corresponds to the figure in which its element is first illustrated.

DETAILED DESCRIPTION

For the sake of brevity, conventional techniques related to making and using aspects of the invention may or may not be described in detail herein. In particular, various aspects of the materials, structures, computing systems, and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, as previously noted herein, flexography is a printing technique used for printing designs, images, text, artwork, and other visual information onto plastic films, paper, corrugated boards, and fabrics. Flexography, which is often referred to as flexographic printing, uses a flexible plate made from soft elastomeric polymers or rubber. A raised image of the design to be printed is formed in/on the flexible plate, which is wrapped around a cylinder and subsequently coated with ink. Each flexible plate applies a different colored ink, such as magenta, yellow, black, or cyan. During printing, the flexible plate comes in contact with the ink and produces print on the target surface or substrate.

Plate processing operations are applied to the flexible plate to prepare it to perform printing operations. A raw form of the flexible plate is provided to the flexographic printing system and secured in place within the appropriate plate processing components of the flexographic printing system. For example, the raw flexible plate can be secured in place by applying a clamping force to selected portions (e.g., edge regions) of the raw flexible plate. Generally, the plate processing components of the flexographic printing system apply plate processing operations to the raw flexible plate to generate a finished or "hardened" flexible plate that includes a desired print pattern (e.g., a name and/or a logo). This print pattern on the finished/hardened flexible plate receives ink and transfers the received ink in the desired print pattern to a target surface or substrate.

The raw flexible plate can include a base layer, a flexible layer, a mask layer and a cover layer. The flexible layer can be formed from a photopolymer. In general, the term photopolymer refers to a class of light-sensitive resins that can be solidified or hardened using a suitable hardening process, such as exposing the photopolymer to ultraviolet (UV) light. When the raw or uncured photopolymer resin comes into contact with a UV light source (e.g., a lamp, laser, or projector), photo-initiators transform that light energy into chemical energy in the form of reactive chemical species. Subsequently, a reaction occurs among some fraction of monomers, oligomers, elastomeric polymers, and other components that cause the exposed areas of the plate to cure, harden, or create a crosslinked structure. Photopolymers can include thermoplastics and/or thermosets. Thermoplastics melt at high temperature, and thermosets can't be melted or reshaped once they have been cured by heat.

In a conventional plate processing operation, the cover layer is removed to reveal the mask layer, and the revealed mask layer is imagewise ablated to define the print pattern. UV light is passed through the opened sections of mask layer to selectively cure or harden a top region of the flexible layer, thereby transferring the print pattern to the cured/hardened portion of the hardened flexible layer. A bottom region (or floor region) of the flexible layer located beneath the top region of the flexible layer is cured or hardened, through the base, in substantially the entire bottom region to provide a support for the selectively hardened top region. The ablated mask and the uncured sections of the top region of the flexible layer are removed, and the cured/hardened top region of the flexible layer receives ink and transfers the ink in the print pattern (e.g., a name and/or a logo) to the target surface or substrate during printing operations.

The previously-described clamping force used to secure the raw flexible plate in place during plate processing operations presents challenges. For example, because the flexible layer is in a raw state that has not yet been cured or hardened, the clamping force can be sufficiently greater than a "resistance to flow" (RTF) of the not-yet-hardened flexible layer to breach the physical integrity of the raw flexible plate by forcing the not-yet-hardened flexible layer to bulge at its edge sidewalls. An example of this is depicted by the edge sidewall bulging region 430A shown in FIG. 7. Bulging pushes portions of the not-yet-hardened flexible layer from between the base layer and the mask layer, thereby reducing the volume of the not-yet-hardened flexible layer and potentially negatively impacting the printing performance of the finished/hardened flexible plate. The bulging can also push portions of the not-yet-hardened flexible layer from between the base layer and the mask layer onto portions of the flexographic printing system. The unwanted presence of not-yet-hardened flexible material (e.g., uncured photopolymer material) on components of the flexographic printing system can interfere with downstream plate processing operations and can be extremely difficult to clean away.

Turning now to an overview of aspects of the invention, embodiments of the invention address the above-described shortcomings of known approaches to securing a raw flexible plate in preparation for plate processing. More specifically, embodiments of the invention provide structures and methods operable to enhance the physical integrity of selected region(s) of a raw flexible plate by selectively applying a pre-hardening process that converts selected portions of to-be-clamped region(s) of the raw flexible plate into pre-hardened regions of the raw flexible plate. In some embodiments of the invention, the structure to enhance the physical integrity of the selected region is a component of a flexographic printing system. The component can include an electromagnetic energy source operable to be controlled by a controller. The electromagnetic energy source is further operable to, prior to post-clamping plate processing operations, apply the pre-hardening process to a raw flexible plate that will be secured in place by the flexographic printing system and, ultimately, during the post-clamping flexible plate processing operations, converted to a finished/hardened flexible plate by the flexographic printing system. More specifically, the not-yet-cured flexible layer of the raw flexible plate includes at least one print region and at least one non-print region. In embodiments of the invention, the at least one print region is a central region of the not-yet-cured flexible layer that will be cured/hardened to form the finished/hardened flexible plate; and the at least one non-print region is one or more edge regions of the not-yet-cured flexible layer that will not form an essential portion of the finished/hardened flexible plate. In accordance with embodiments of the invention, the at least one non-print region will receive, through the flexographic printing system, a clamping force operable to secure the raw flexible plate in place; and the electromagnetic energy source is operable to apply the pre-hardening process to the at least one non-print region of the not-yet-cured flexible layer of the raw flexible plate to convert the at least one non-print region to a pre-hardened region of the raw flexible plate. In some embodiments of the invention, the pre-hardening process is applied to the at least one non-print region in a manner that prevents the clamping force from bulging an edge sidewall of the pre-hardened regions. In some embodiments of the invention, the pre-hardening process is applied to the at least one non-print region and completed before the clamping force is applied. In some embodiments of the invention, the pre-hardening process overlaps with the application of the clamping force; and the pre-hardening process raises the at least one non-print region to a predetermined hardness level (or within a predetermined range of hardness levels) that is sufficient to substantially prevent the clamping force from bulging the edge sidewall of the at least one non-print region. In some embodiments of the invention, the not-yet-hardened flexible layer includes a photopolymer material; the pre-hardening process includes a curing process; and the curing process includes an ultraviolet (UV) electromagnetic radiation curing process. In some aspects of the invention, embodiments of the invention provide a method of fabricating the above-described component of a flexographic printing system.

In embodiments of the invention, the hardness level of the finished/hardened flexible plate has a different purpose than the hardness level of the pre-hardened regions. The hardness level of the finished/hardened flexible plate is sufficient to enable the finished/hardened flexible plate to perform ink-transfer printing operations using the flexographic printing system. The hardness level of the pre-hardened regions is sufficient to counter the clamping force enough to prevent the clamping force from reducing a height dimension at the edges of the raw flexible plate sufficiently to breach the physical integrity of the raw flexible plate by forcing the not-yet-cured portions of the flexible layer to create an edge sidewall bulging region at an edge sidewall of the flexible layer. In other words, the hardness level of the pre-hardened regions is sufficient to prevent the clamping force applied to the pre-hardened regions from bulging edge sidewalls of the pre-hardened regions such that some portion of pre-hardened regions lands on a component of the flexographic printing system (e.g., the plate support element 510 shown in FIG. 5). The hardness level of the pre-hardened regions can be less than the hardness level of the finished/hardened flexible plate in that the hardness level that is needed to enable the finished/hardened flexible plate to perform ink-transfer printing operations is greater than the hardness level that is sufficient to prevent the clamping force applied to the pre-hardened regions from bulging edge sidewalls of the pre-hardened regions such that some portion of pre-hardened regions lands on a component of the flexographic printing system.

In embodiments of the invention, the hardness levels described herein can be determined in any suitable way and in accordance with any material property that enables the material's RTF to be assessed. In general, the term "hardness" refers to the resistance of a material to penetration, or indentation caused by a specific type of indenter under specified conditions and is dependent on its elastic modulus and viscoelastic behavior. There is no simple relationship between the measurements obtained with one type of instrument and those obtained with another. Empirical test methods, which involve pressing an indenter of specified dimensions into a test piece under a specified load and measuring the depth of indentation, are intended primarily for control purposes. Hardness measurements of photopolymer flexographic plate materials can be made with durometers (Shore hardness) as described in International Standard ISO 48-4:2018(E) and ASTM D2240. Measurement with a durometer instrument involves factors such as the elastic modulus of the rubber, its viscoelastic properties, the thickness of the test piece, the geometry of the indenter, the pressure exerted, the rate of increase of pressure, and the interval after which the hardness is recorded. Results from various instruments cannot be directly related to each other, although correlations have been established for some materials.

In some embodiments of the invention, the hardness levels and/or RTF levels described herein can be determined by reference to the viscosity or viscosity level of the relevant material. The viscosity level of a material is a measure of that material's resistance to deformation or RTF at a given rate. More generally, the viscosity level corresponds to the informal concept of "thickness" of a fluid. For example, syrup has a higher viscosity than water, and is often called "thicker" than water. Viscosity is defined scientifically as a force multiplied by a time divided by an area. Thus, viscosity's SI units are newton-seconds per square meter, or pascal-seconds. Viscosity quantifies the internal frictional force between adjacent layers of material that are in relative motion. For instance, when a viscous material is forced through a tube, it flows more quickly near the tube's axis than near its walls. Experiments show that some stress (such as a pressure difference between the two ends of the tube) is needed to sustain the flow. This is because a force is required to overcome the friction between the layers of the material, which are in relative motion. For fluids flowing in a tube of a given diameter with a constant flow rate, the strength of the compensating force is proportional to the material's viscosity.

In some embodiments of the invention, the previously-described structure that is operable to enhance the physical integrity of selected region(s) of a raw flexible plate can be at least partially embodied in the raw flexible plate itself, which is operable to be processed and used by a flexographic printing system. The raw flexible plate includes a print region, a non-print region having an exposed edge sidewall, and an electromagnetic energy source. The electromagnetic energy source is operable to, responsive to instructions from a controller, convert at least a portion of the non-print region to a pre-hardened non-print region by applying a pre-hardening process to at least a portion of the non-print region. In embodiments of the invention, the pre-hardening process is applied through the exposed edge sidewall and into at least a portion of the non-print region. The raw flexible plate will be clamped or otherwise secured in place by the flexographic printing system and converted to a finished/hardened flexible plate using post-clamping flexible plate processing operations performed by the flexographic printing system. The not-yet-cured flexible layer of the raw flexible plate includes at least one instance of the print region and at least one instance of the non-print region. In embodiments of the invention, the at least one instance of the print region is a central region of the not-yet-cured flexible layer that will be cured/hardened to form the finished/hardened flexible plate; and the at least one instance of the non-print region is one or more edge regions of the not-yet-cured flexible layer that will not form an essential portion of the finished/hardened flexible plate.

In accordance with embodiments of the invention, the at least one non-print region will receive, through the flexographic printing system, a clamping force operable to secure the raw flexible plate in place; and the electromagnetic energy source is operable to apply the pre-hardening process to the at least one non-print region of the not-yet-cured flexible layer of the raw flexible plate. In some embodiments of the invention, the pre-hardening process is applied to the at least one non-print region in a manner that prevents the clamping force from bulging an edge sidewall of the at least one non-print region. In some embodiments of the invention, the pre-hardening process is applied to the at least one non-print region in a manner that prevents the clamping force from bulging an edge sidewall of the at least one non-print region such that some portion of bulged portion of the non-print region contacts and/or interferes with operations of the flexographic printing system. In some embodiments of the invention, the pre-hardening process is applied to the at least one non-print region and completed before the clamping force is applied. In some embodiments of the invention, the pre-hardening process overlaps with the application of the clamping force; and the pre-hardening process raises the at least one non-print region's RTF to a predetermined level (or within a predetermined range of levels) that is sufficient to substantially prevent the clamping force from bulging the edge sidewall of the at least one non-print region. In embodiments of the invention, the RTF level can be determined based on any suitable material property that reflects the material's RFT, including, for example, any one or more of the material's hardness and/or viscosity. In some embodiments of the invention, the not-yet-hardened flexible layer includes a photopolymer material; the pre-hardening process includes a curing process; and the curing process includes an ultraviolet (UV) electromagnetic radiation curing process.

In some embodiments of the invention, the electromagnetic energy source of the above-described raw flexible plate can be implemented as an array of addressable light emitting diodes (LEDs); and the raw flexible plate can further include a sensor network and a local processor or controller. The sensor network can be made operable to detect when the raw flexible plate is within a predetermined range of a clamping mechanism of the flexographic printing system. In response to detecting when the raw flexible plate is within a predetermined range of a clamping mechanism, the sensor can notify the local controller, which determines and activates the addressable LEDs positioned such that they provide curing UV light to the non-print region of the raw flexible plate. In some embodiments of the invention, the controller can also, responsive to receiving a notification that the raw flexible plate is within a predetermined range of a clamping mechanism, issue an interrupt or pause or delay command to a controller of the flexographic printing system to interrupt/pause/delay the application of the clamping force to the non-print region of the raw flexible plate in a manner that prevents the clamping force from bulging an edge sidewall of the at least one non-print region before the pre-hardening process has sufficiently hardened the at least one non-print region. In some embodiments of the invention, the pre-hardening process is applied to the at least one non-print region and completed before the clamping force is applied. In some embodiments of the invention, the pre-hardening process overlaps with the application of the clamping force; and the pre-hardening process raises the RTF of the at least one non-print region to a predetermined level (or within a predetermined range of levels) that is sufficient to substantially prevent the clamping force from bulging the edge sidewall of the at least one non-print region. In some aspects of the invention, embodiments of the invention provide a method of fabricating the above-described a raw flexible plate.

Turning now to a more detailed description of aspects of the invention, FIG. 1 depicts a simplified diagram illustrating a flexographic printing system 110 having plate processing functionality 120, printing functionality 130, and a controller 140, configured and arranged as shown. The flexographic printing system 110 implements flexography printing techniques operable to print designs, images, text, artwork, and other visual information onto plastic films, paper, corrugated boards, and fabrics. The flexographic printing system 110 represents a wide variety of implementations of flexographic printing systems. For example, in a non-limiting example embodiment of the invention, the flexographic printing system 110 is operable to use a flexible plate (e.g., raw flexible plate 210 shown in FIG. 2; and finished or hardened flexible plate 220 shown in FIG. 2) made from soft elastomeric polymer or rubber. The plate processing functionality 120 is used to form a raised image of the design to be printed in/on the flexible plate, and the printing functionality 130 is used to wrap the processed flexible plate around a cylinder and substantially coated with ink. Each flexible plate applies a different colored ink, such as magenta, yellow, black, or cyan. During the execution of the printing functionality 130, the flexible plate comes in contact with the ink and produces print on the target surface or substrate.

The various operations performed by the plate processing functionality 120 and/or the printing functionality 130 are controlled using one or more instances of the controller 140. In some embodiments of the invention, the controller can be implemented with the features and functionality of the computing system 1600 (shown in FIG. 16). In some embodiments of the invention, the controller 140 is in wired or wireless communication with a cloud computing system 50. The cloud computing system 50 can supplement, support or replace some or all of the electronic and/or processor functionality of the controller 140. Additionally, some or all of the functionality of the controller 140 can be implemented as a node of the cloud computing system 50.

Figure 2:
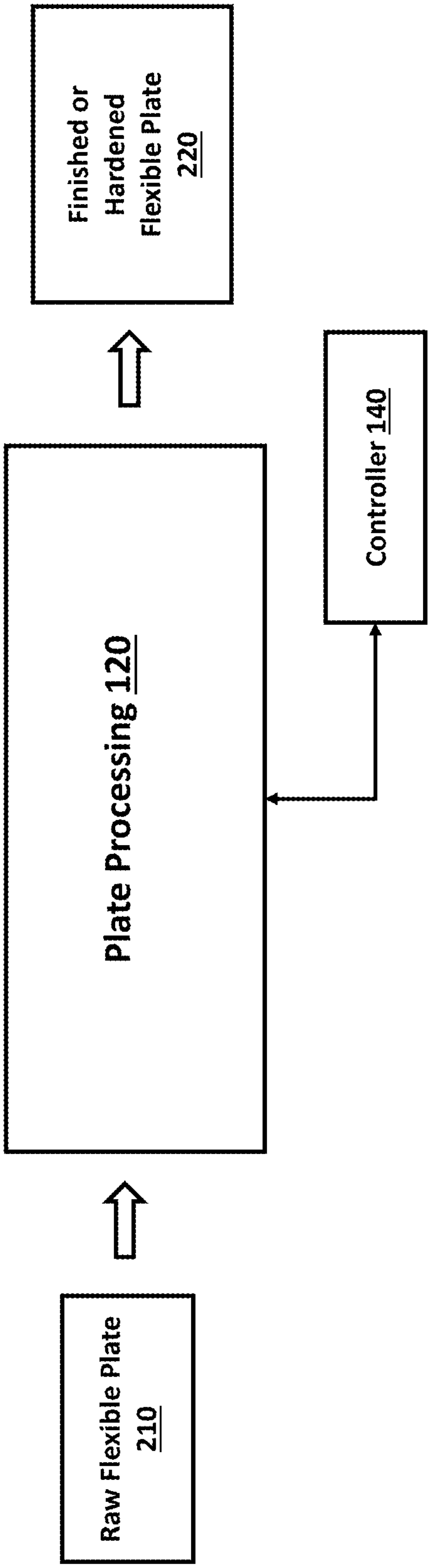
FIG. 2 depicts a simplified block diagram illustrating additional details of a portion of the printing system shown in FIG. 1.

FIG. 2 depicts additional details of the plate processing functionality 120 in which plate processing operations are applied to a raw flexible plate 210 to convert it to a finished or hardened flexible plate 220 that is be used to perform the operations of the printing functionality 130 (shown in FIG.

1). The raw flexible plate 210 is provided to the plate processing functionality 120 of the flexographic printing system 110 (shown in FIG. 1) and secured in place within the appropriate plate processing components (e.g., adjustable clamping element 610 shown in FIG. 6) of the flexographic printing system 110. For example, the raw flexible plate 210 can be secured in place by applying a clamping force (e.g., clamping force 710 shown in FIGS. 7 and 9) to selected portions (e.g., edge regions) of the raw flexible plate 210. The finished or "hardened" flexible plate 220 includes a desired print pattern (e.g., a name and/or a logo). In the printing functionality 130, the print pattern on the finished/hardened flexible plate 220 receives ink and transfers the received ink in the desired print pattern to a target surface or substrate (e.g., printing substrate 1520 shown in FIG. 15B).

Figure 3:
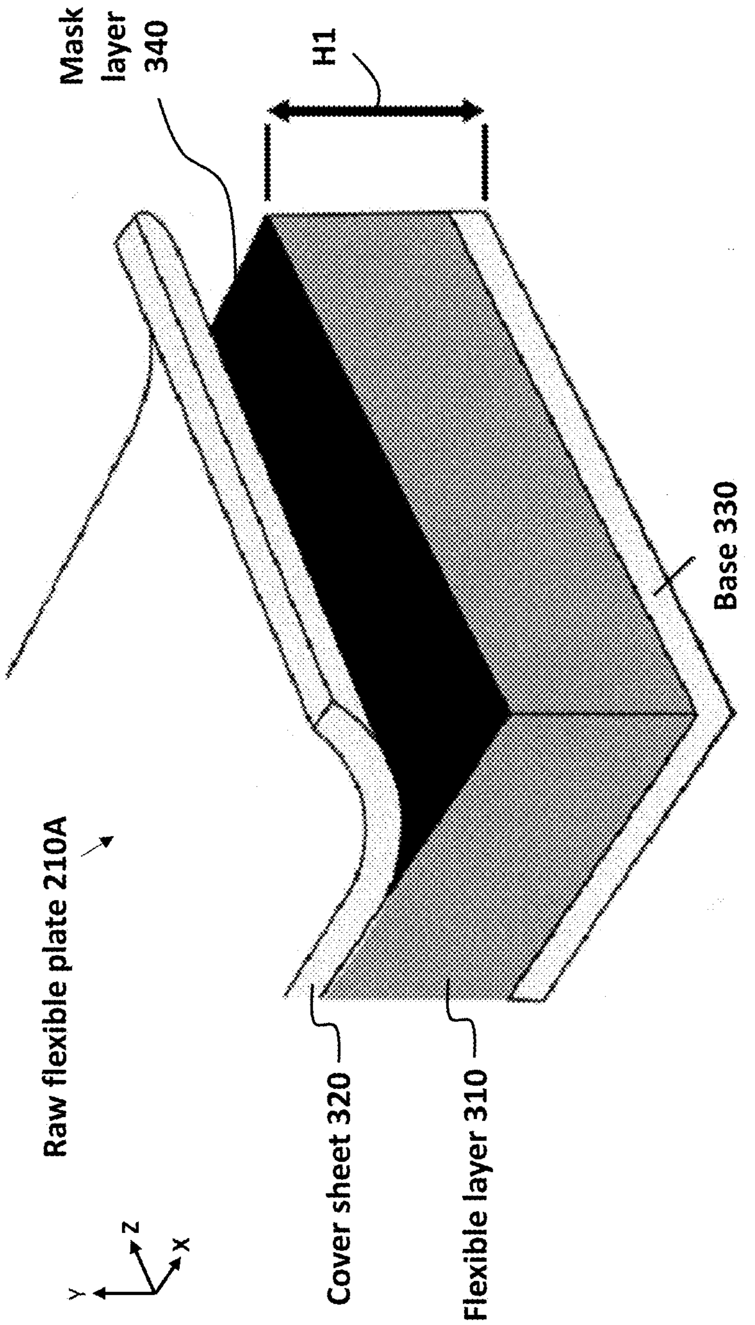
FIG. 3 depicts a simplified block diagram illustrating a three-dimensional (3D) (or isometric) representation of a raw flexible plate in accordance with embodiments of the invention.

FIG. 3 depicts a simplified block diagram illustrating a 3D (or isometric) representation of a raw flexible plate 210A, which is a non-limiting example of how the raw flexible plate 210 (shown in FIG. 2) can be implemented in accordance with embodiments of the invention. As shown, the raw flexible plate 210A includes a flexible layer 310 between a mask layer 340 and a base layer 330. A protective cover sheet 320 is provided over the mask layer 340. In some embodiments of the invention, the base layer 330 is formed from a polyester material. In some embodiments of the invention, the flexible layer 310 is formed from a raw or uncured photopolymer. In general, the term photopolymer refers to a class of light-sensitive resins that solidify when exposed to ultraviolet (UV) light. When the raw or uncured photopolymer resin comes into contact with a UV light source (e.g., a lamp, laser, or projector), photo-initiators transform that light energy into chemical energy in the form of reactive chemical species. Subsequently, a reaction occurs among some fraction of monomers, oligomers, elastomeric polymers, and other components that cause the exposed areas of the plate to cure, harden, or create a crosslinked structure. Photopolymers can include thermoplastics and/or thermosets. Thermoplastics melt at high temperature, and thermosets can't be melted or reshaped once they have been cured by heat. In some embodiments of the invention, the mask layer 340 can be implemented as a laser ablation mask system (LAMS). Laser ablation or photoablation (also called laser blasting) is the process of removing material from a solid surface by irradiating it with a laser beam. At low laser flux, the material is heated by the absorbed laser energy and evaporates or sublimates. At high laser flux, the material is typically converted to a plasma. In some embodiments of the invention, the cover sheet or layer 320 is formed from any suitable flexible protective material. Examples of suitable materials for the cover sheet or layer 320 include thin films of polystyrene, polyethylene, polypropylene, polycarbonate, fluoropolymers, polyamide or polyesters, which can be subbed with release layers. The cover sheet or layer 320 is preferably prepared from polyester, such as a polyethylene terephthalate film.

In some embodiments of the invention, a suitable thickness dimension of the base layer 330 is about 0.005 inches. In some embodiments of the invention, a suitable thickness dimension of the flexible layer 310 is within a range from about 0.030 inches to about 0.250 inches. In some embodiments of the invention, a suitable thickness dimension (H1) of the flexible layer 310 is within a range from about 0.76 mm to about 6.35 mm. In some embodiments of the invention, a suitable thickness dimension of the mask layer 340 is within a range from about 20 angstroms to about 50 micrometers.

Figure 4:
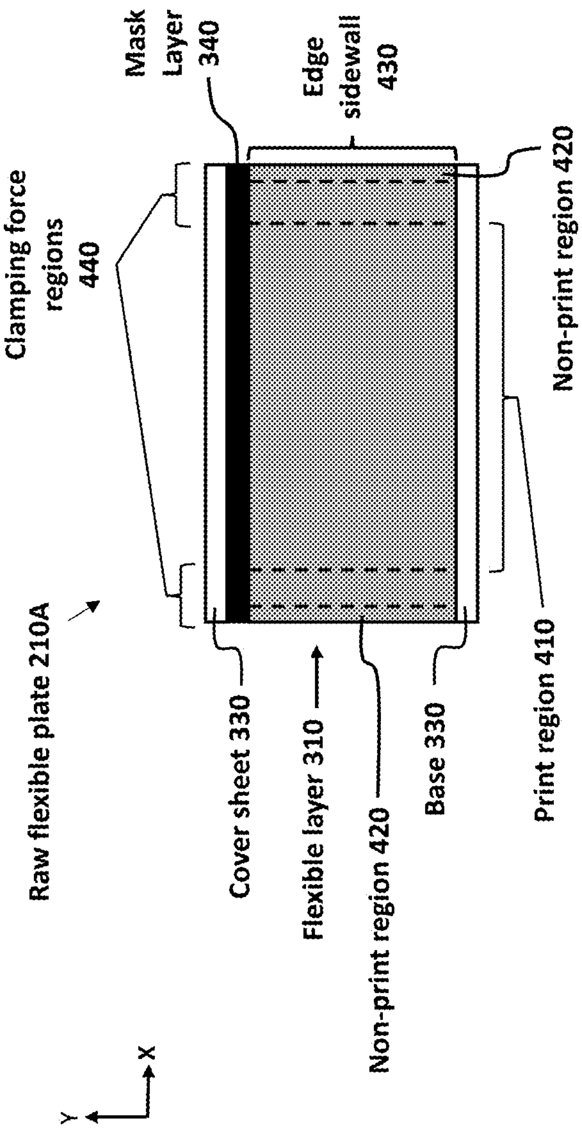
FIG. 4 depicts a simplified block diagram illustrating a two-dimensional (2D) representation of a raw flexible plate in accordance with embodiments of the invention.

FIG. 4 depicts a simplified block diagram illustrating a 2D representation of the raw flexible plate 210A in accordance with embodiments of the invention. The 2D view shown in FIG. 4 illustrates how the flexible layer 310 can be segmented into a print region 410, non-print regions 420, and clamping force regions 440, configured and arranged as shown. In the embodiment of the invention depicted in FIG. 4, the non-print region 420 is within the clamping force region 440 and covers less area than the clamping force region 440.

Figure 5:
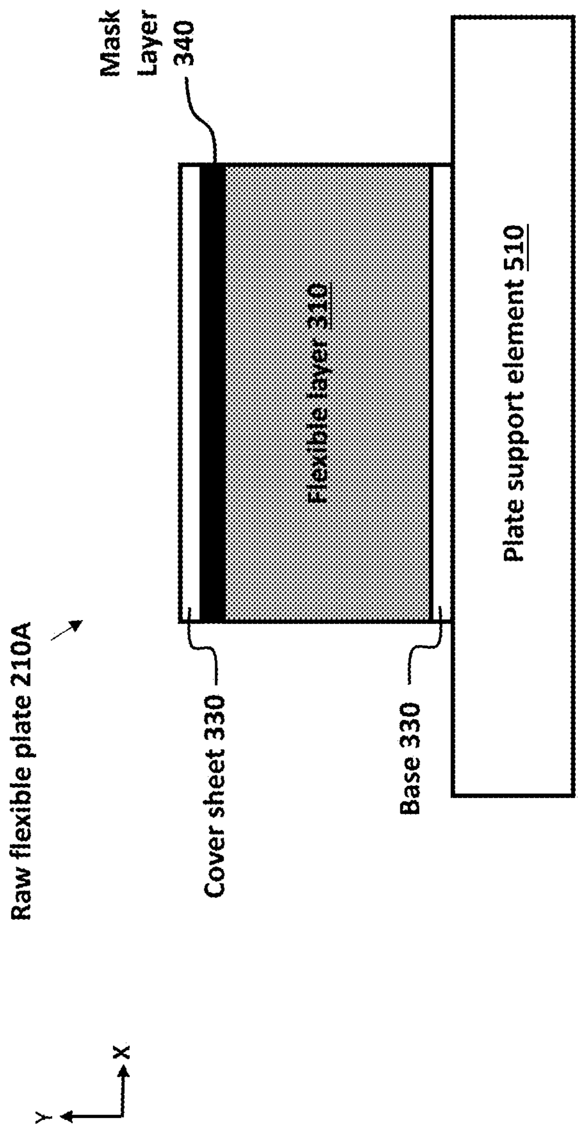
FIG. 5 depicts a simplified block diagram illustrating a 2D representation of a raw flexible plate during plate processing operations in accordance with embodiments of the invention.
Figure 6:
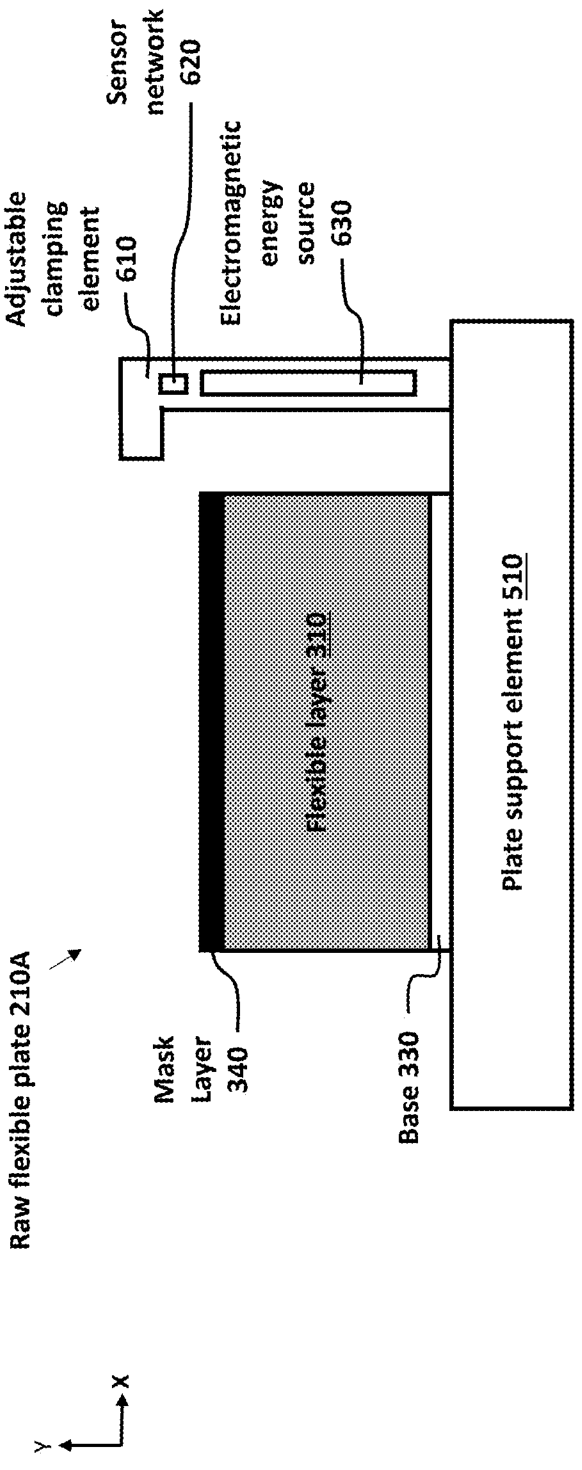
FIG. 6 depicts a simplified block diagram illustrating a 2D representation of a raw flexible plate during plate processing operations in accordance with embodiments of the invention.

FIGS. 5, 6, 8, 9, 11, 13, and 14 illustrate the raw flexible plate 210A during and after some plate processing operations (performed by the plate processing functionality 120 shown in FIGS. 1 and 2) in accordance with embodiments of the disclosure. As shown in FIG. 5, known flexographic printing operations have been used to initially place the raw flexible plate 210A on a plate support element 510 of the flexographic printing system 110 (shown in FIG. 1). As shown in FIG. 6, known flexographic printing operations have been used to remove the cover sheet 330 to expose the mask layer 340. As also shown in FIG. 6, known flexographic printing operations have been used to bring an adjustable clamping element 610 near the raw flexible plate 210A. A simplified block diagram is used to represent the plate support element 510 and the adjustable clamping element 610, and in practice, the plate support element 510 and the adjustable clamping element 610 can be implemented in any suitable format and structure. In accordance with embodiments of the invention, the adjustable clamping element 610 is configured and arranged to include a sensor network 620 and an electromagnetic energy source 630. The sensor network 620 is operable to detect the presence of the raw flexible plate 210A, and more specifically detect the presence of the raw flexible plate 210A before the adjustable clamping element 610 has been moved into a position that would allow the adjustable clamping element 610 to apply a clamping force 710 (shown in FIGS. 7 and 9) through the mask layer 340 and into the non-print region 420 (shown in FIG. 4).

The electromagnetic energy source 630 is positioned based on the desired entry point(s) of the electromagnetic energy 810, 1111 (shown in FIGS. 8 and 11) into the flexible layer 310. In some embodiments of the invention, the desired entry point is through edge sidewalls 430 of the flexible layer 310, which means that the electromagnetic energy source 630 is located such that it transmits electromagnetic energy 810 through the edge sidewalls 430 (at any angle) of the flexible layer 310. In some embodiments of the invention, the desired entry point is through portions of the base 330 and portions of the flexible layer 310, which means that the electromagnetic energy source 630 is located such that it transmits electromagnetic energy 1111 through the base 330 and into selected portions of the flexible layer 310 at any angle. In some embodiments of the invention, the desired entry point is through portions of a top surface of the flexible layer 310, which means that the electromagnetic energy source 630 is located such that it transmits electromagnetic energy 1111 through selected top portions of the flexible layer 310 (at any angle) after an appropriate section of the mask layer 340 has been removed to reveal the selected top portions of the flexible layer 310. In the embodiments of the invention depicted in FIGS. 6, 8 and 9, the electromagnetic energy source 630 is part of the adjustable clamping element 610. However, it is contemplated that, in some embodiments of the invention, the electromagnetic energy source 630 can be in any suitable location in, on or coupled to the flexographic printing system 110 (shown in FIG. 1).

Figure 7:
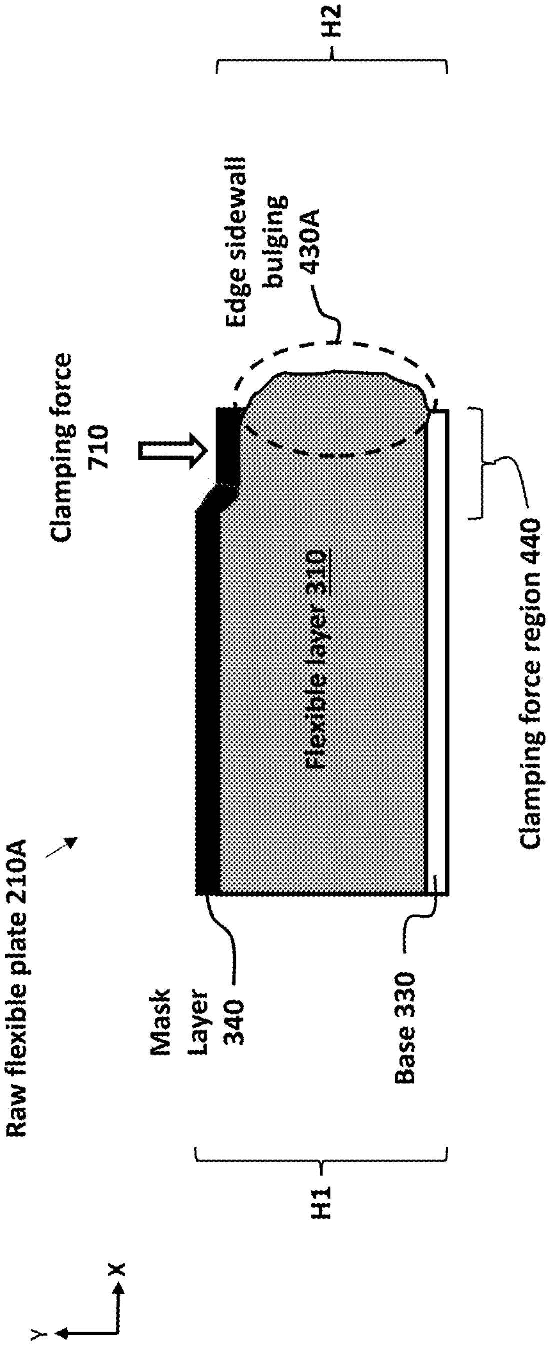
FIG. 7 depicts a simplified block diagram illustrating a 2D representation of a raw flexible plate experience undesired bulging in accordance with embodiments of the invention.

FIG. 7 illustrates a result of applying the clamping force 710 without benefit of embodiments of the present invention. In some embodiments of the invention, the flexible layer 310 is formed from a not-yet-cured photopolymer having an initial RTF. In some embodiments of the invention, the RTF of the not-yet-cured photopolymer can be evaluated based at least in part on a viscosity level of the not-yet-cured photopolymer. The viscosity level of the not-yet-cured photopolymer is a measure of its resistance to deformation at a given rate. More generally, the viscosity level corresponds to the informal concept of “thickness.” For example, syrup has a higher viscosity than water. Viscosity is defined scientifically as a force multiplied by a time divided by an area. Thus, viscosity’s SI units are newton-seconds per square meter, or pascal-seconds. Viscosity quantifies the internal frictional force between adjacent layers of material that are in relative motion. For instance, when a viscous material is forced through a tube, it flows more quickly near the tube’s axis than near its walls. Experiments show that some stress (such as a pressure difference between the two ends of the tube) is needed to sustain the flow. This is because a force is required to overcome the friction between the layers of the material, which are in relative motion. For a tube with a constant rate of flow, the strength of the compensating force is proportional to the material’s viscosity.

Figure 14:
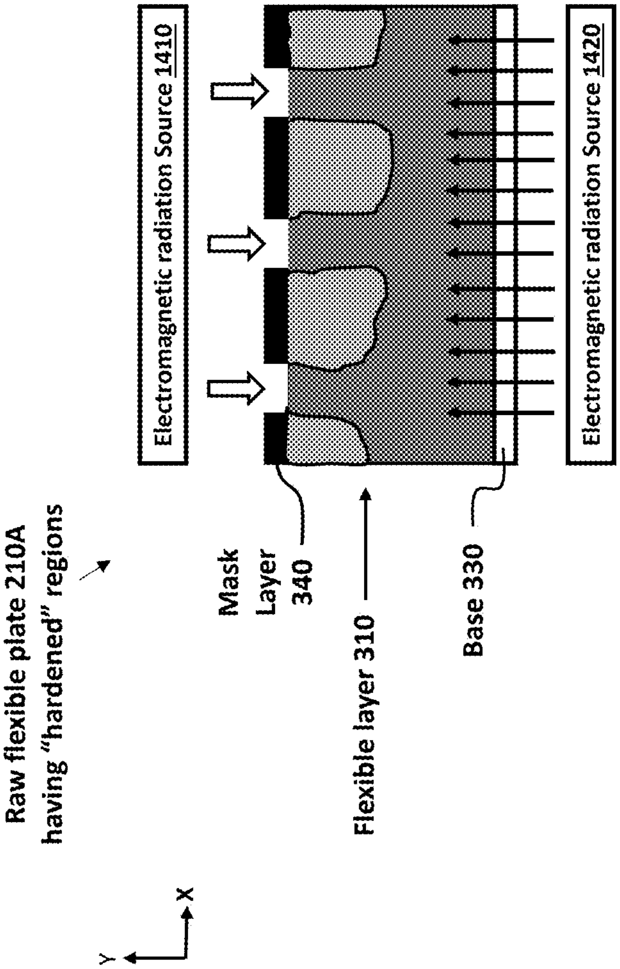
FIG. 14 depicts a simplified block diagram illustrating a 2D representation of a raw flexible plate having "hardened" regions during plate processing operations in accordance with embodiments of the invention.
Figure 15A:
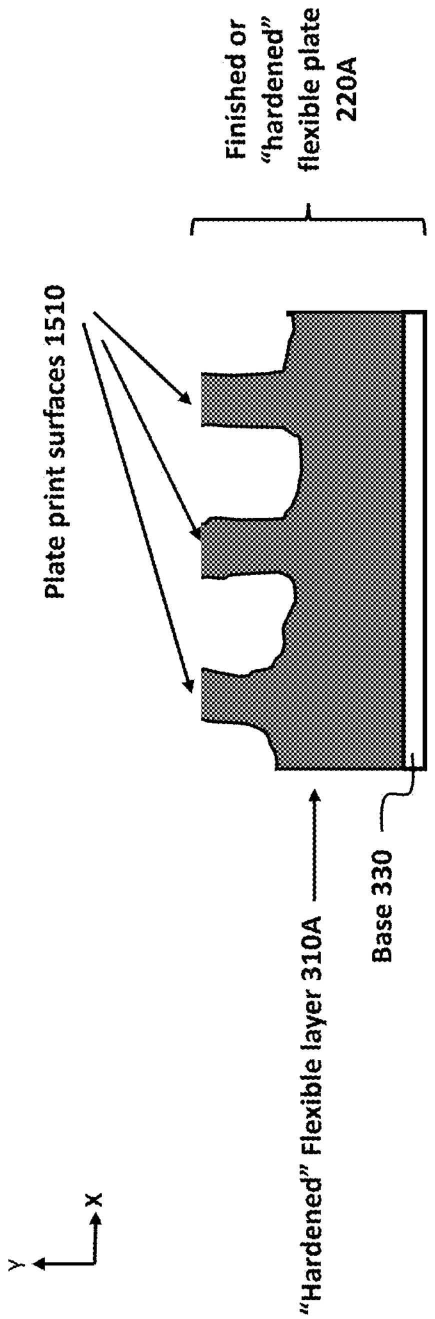
FIG. 15A depicts a simplified block diagram illustrating a 2D representation of a "finished" or "hardened" flexible plate in accordance with embodiments of the invention.
Figure 15B:
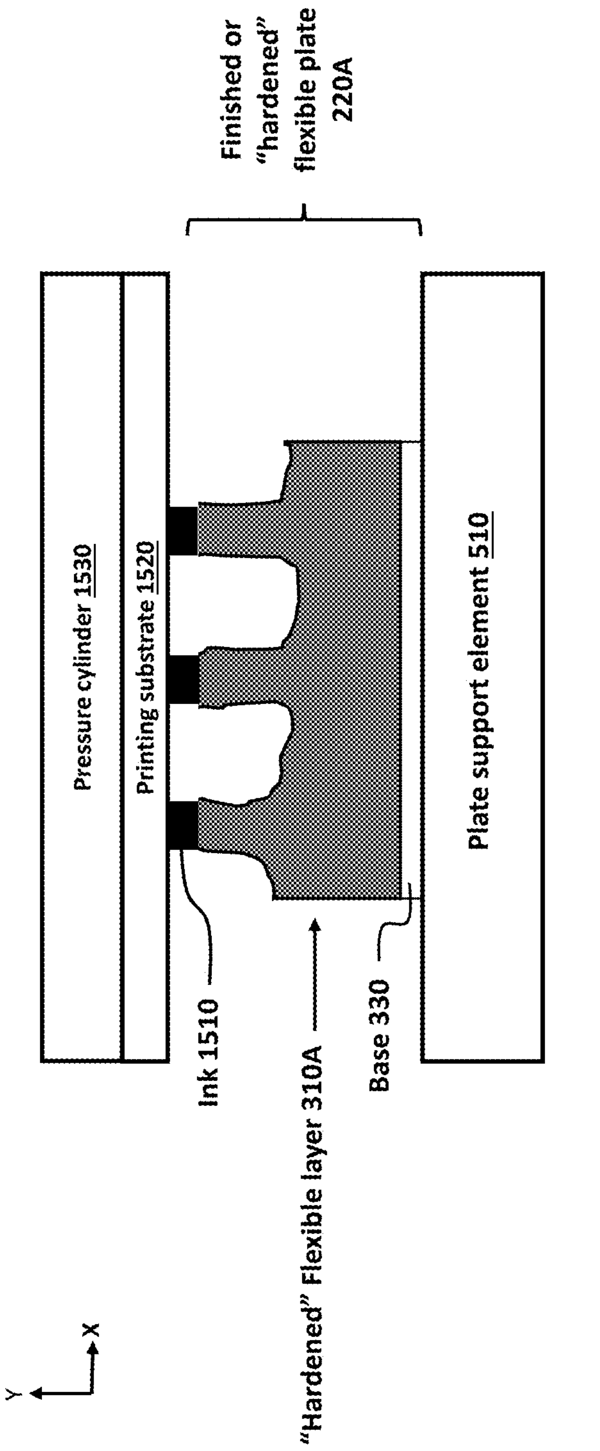
FIG. 15B depicts a simplified block diagram illustrating a 2D representation of a finished/hardened flexible plate during printing operations in accordance with embodiments of the invention.

As shown in FIG. 7, the viscosity level of the photopolymer that forms the flexible layer 310 is a viscosity level that is low enough to perform the operations of the raw flexible plate 210A, including specifically a viscosity level that is low enough to enable hardening operations (e.g., as shown in FIG. 14) to be applied as part of the process of forming the finished/hardened flexible plate 220, 220A (shown in FIGS. 2, 15A, and 15B). A clamping force 710 is applied through a clamping force region 440 of the raw flexible plate 210A to secure the raw flexible plate 210A in place to perform the operations of the plate processing functionality 120. However, any counter to the clamping force 710 provided by the viscosity level of the flexible layer 310 is insufficient to prevent the clamping force 710 from depressing the mask layer 340 and breaching the physical integrity of the raw flexible plate 210A by forcing the not-yet-hardened photopolymer of the flexible layer 310 to create an edge sidewall bulging region 430A at an edge sidewall 430 (shown in FIG. 4) of the flexible layer 310. In other words, as shown in FIG. 7, the clamping force 710 is sufficiently greater than the viscosity level of the not-yet-hardened photopolymer in the flexible layer 310 to push a portion of the mask layer 340 closer to the base 330 (i.e., closer than other portions of the mask layer 340), thereby breaching the physical integrity of the raw flexible plate 210A by forcing the not-yet-hardened photopolymer of the flexible layer 310 to create an edge sidewall bulging region 430A at an edge sidewall 430 of the flexible layer 310. As shown in FIG. 7, the clamping force 710 is sufficient to change or reduce a height dimension of the raw flexible plate 210A from H1 to H2 in the region where the clamping force 710 is applied. Bulging pushes portions of the not-yet-hardened photopolymer of the flexible layer 310 from between the base layer 330 and the mask layer 340, thereby reducing the volume of the not-yet-hardened photopolymer of the flexible layer 310 and potentially negatively impacting the printing performance of the finished/hardened flexible plate 220, 220A. The bulging can also push portions of the not-yet-hardened photopolymer of the flexible layer 310 from between the base layer 330 and the mask layer 340 onto portions (e.g., the plate support 510) of the flexographic printing system 110. The unwanted presence of not-yet-hardened photopolymer material of the flexible layer 310 on components of the flexographic printing system 110 would need to be cleaned away to ensure that there is no interference with downstream plate processing and printing operations.

Figure 8:
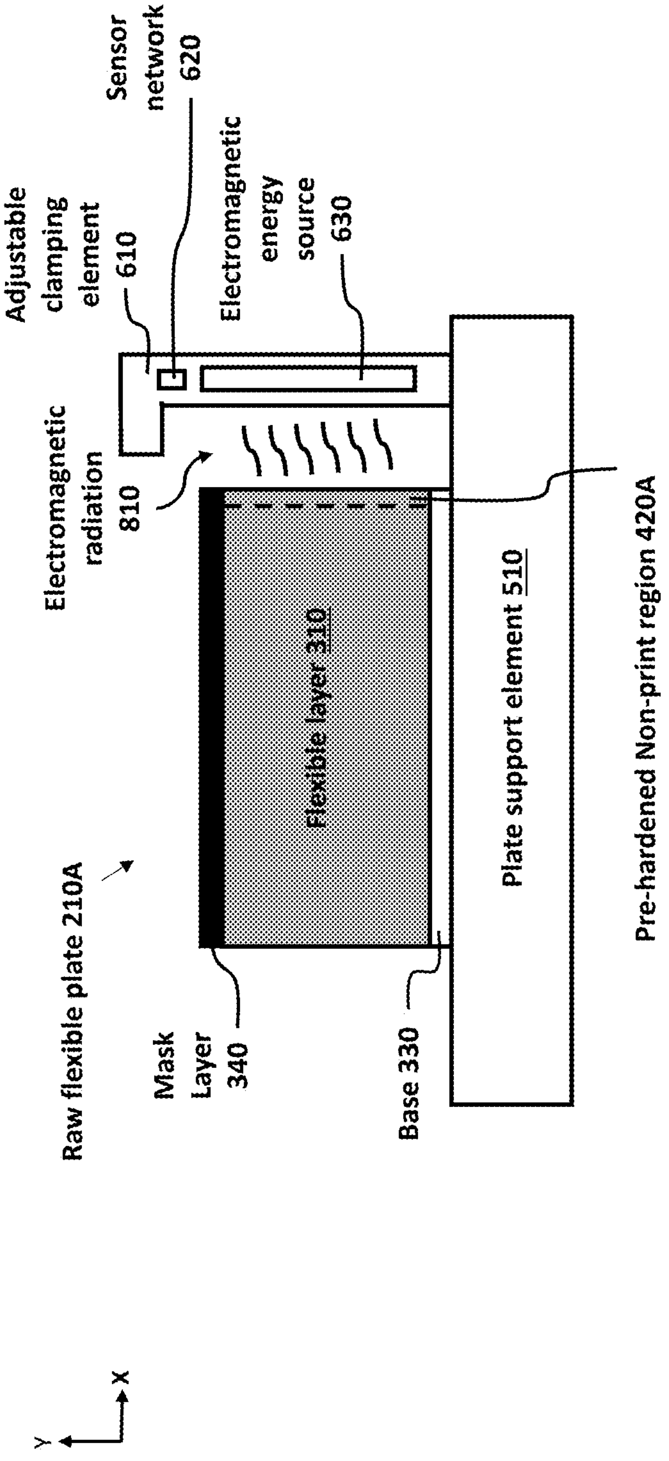
FIG. 8 depicts a simplified block diagram illustrating a 2D representation of a raw flexible plate during plate processing operations in accordance with embodiments of the invention.

In FIG. 8, the sensor network 620 has detected the presence of the raw flexible plate 210A, and more specifically has detected the presence of the raw flexible plate 210A before the adjustable clamping element 610 has been moved into a position that would allow the adjustable clamping element 610 to apply a clamping force 710 (shown in FIGS. 7 and 9) through a clamping force region 440 (shown in FIG. 7) of the raw flexible plate 210A that includes portions of the mask layer 340 and portions of the non-print region 420 (shown in FIG. 4). In some aspects of the invention, the clamping force region 440 covers a larger area of the flexible layer 310 than the non-print region 420. At this stage, the controller 140, responsive to the sensor network 620 detecting the presence of the raw flexible plate 210A, activates the electromagnetic energy source 630 to provide electromagnetic radiation 810 (e.g., UV light) through the edge sidewall 430 (shown in FIG. 4) and into the non-print region 420 to create a pre-hardened non-print region 420A. In accordance with embodiments of the invention, the RTF or the viscosity level of the pre-hardened non-print region 420A is sufficient to counter the clamping force 710 and substantially prevent the clamping force 710 from creating the edge sidewall bulging region 430A (shown in FIG. 7). Other embodiments of the invention can activate the electromagnetic energy source 630 concurrently with (or overlapping with) or somewhat after the application of the clamping force 710.

In accordance with embodiments of the invention, the electromagnetic energy source 630 and the controller 140 are operable to control the intensity and the duration of the application of the electromagnetic energy radiation 810, which define the area and/or shape of the pre-hardened non-print region 420A, as well as the viscosity level of the pre-hardened non-print region 420A. In accordance with embodiments of the invention, the area and/or shape of the pre-hardened non-print region 420A is configured to be substantially within the clamping force regions 440 (shown in FIGS. 4 and 7). In some embodiments of the invention, the desired shape, area, and viscosity level of the pre-hardened non-print region 420A can be set up as an optimization problem that can be solved by an optimization algorithm of the controller 140. The optimization algorithm of the controller 140 can be configured to receive as inputs the desired area/shape and viscosity level of the material in the pre-hardened non-print region 420A, and generate in response to the inputs optimized values of the intensity and the duration of the application of the electromagnetic energy radiation 810. Substantially the same optimization approach can be used to generate the electromagnetic radiation 1111 (shown in FIG. 11).

Figure 9:
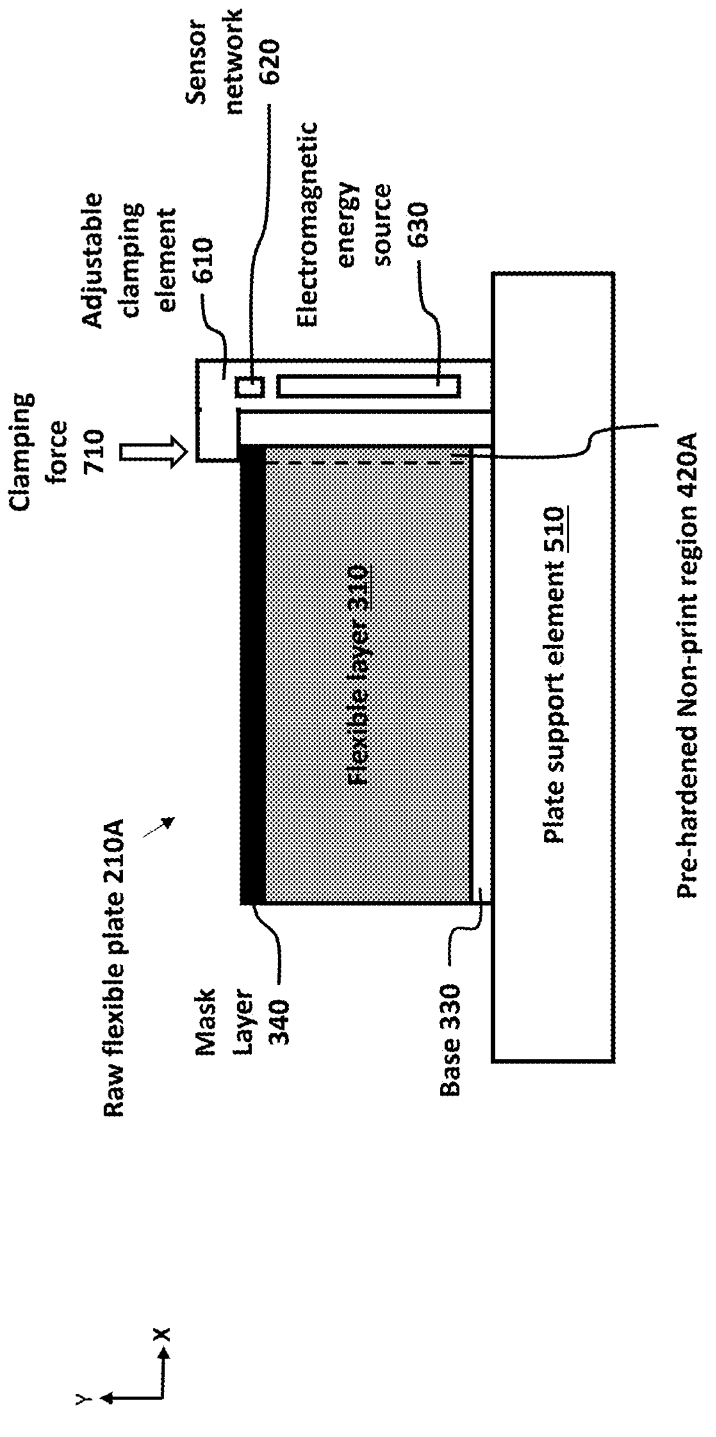
FIG. 9 depicts a simplified block diagram illustrating a 2D representation of a raw flexible plate during plate processing operations in accordance with embodiments of the invention.

As shown in FIG. 9, known fabrication operations have been used to move the adjustable clamping element 610 into position to apply the clamping force 710 over the pre-hardened non-print region 420A, thereby securing the raw flexible plate 210A in place within the flexographic printing system 110.

Figure 10:
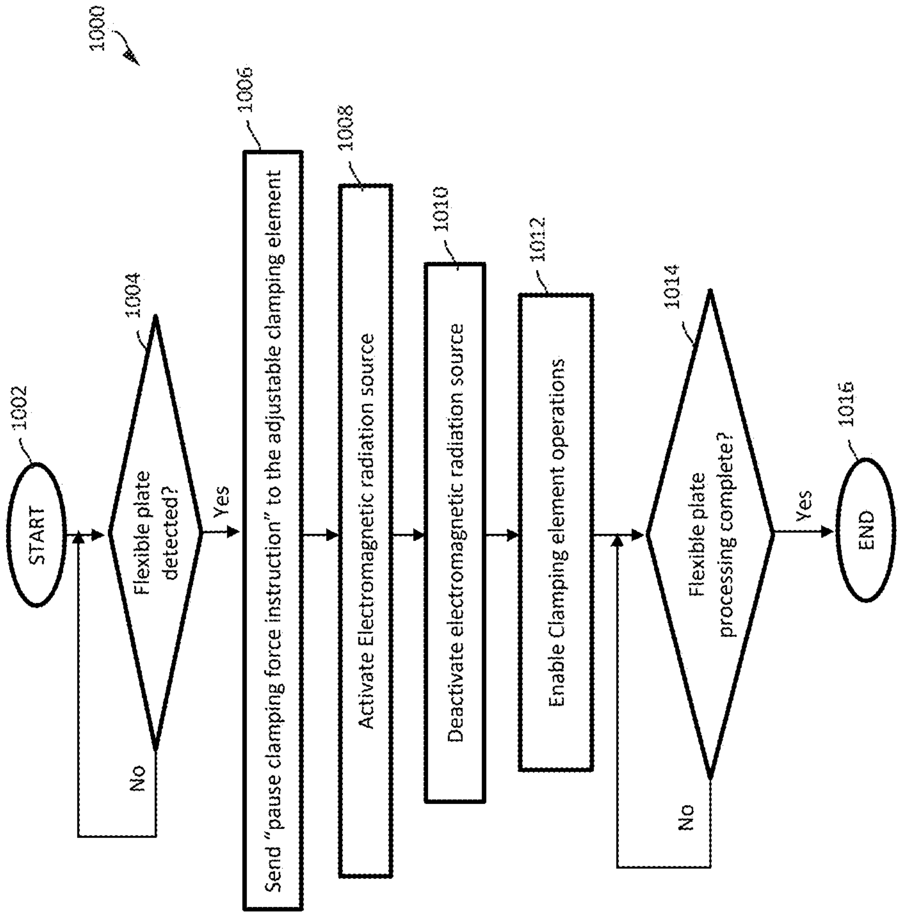
FIG. 10 depicts a flow diagram illustrating a methodology in accordance with embodiments of the invention.

FIG. 10 depicts a methodology 1000 reflecting plate processing operations performed by the plate processing functionality 120 in accordance with embodiments of the invention. The following descriptions of the methodology 1000 make reference to the methodology 1000 shown in FIG. 10, as well as aspects of the raw flexible plate 210, 210A and the flexographic printing system 110 shown in FIGS. 1-9 that implement the methodology 1000. As shown in FIG. 10, the methodology 1000 starts at block 1002 then moves to decision block 1004 where the sensor network 610 determines whether or not the raw flexible plate 210A has been detected within a predetermined distance from the adjustable clamping element 610. If the answer to the inquiry at decision block 1004 is no, the methodology 1000 returns to the input to decision block 1004. If the answer to the inquiry at decision block 1004 is yes, the methodology 1000 moves to block 1006 and the controller 140 is operable to, responsive to the sensor network 620 detecting a proximity of the raw flexible plate 210A to the adjustable clamping element 610, send a "pause clamping force instruction" to the adjustable clamping element 610, which prevents, interrupts, and/or pauses any clamping operation provided by the adjustable clamping element 610. The methodology 1000 moves to block 1008 and activates the electromagnetic energy source 630 to provide electromagnetic radiation 810 through the edge sidewall 430 to the non-print region 420, thereby creating the pre-hardened non-print region 420A. After waiting a predetermined period of time to allow the pre-hardened non-print region 420A to form, the methodology 1000 moves to block 1010 and deactivates the electromagnetic energy source 630 to stop providing electromagnetic radiation 810 through the edge sidewall 430. In some embodiments of the invention, the electromagnetic energy source 630 is activated for a predetermined time then times out, which would make the operation at block 1010 unnecessary. The methodology 1000 moves to block 1012 and enables clamping element operations that allow the adjustable clamping element 610 to move into place over the non-print region 420 and apply the clamping force 710. The methodology 1000 moves to decision block 1014 and determines through the controller 140 whether or not plate processing operations of the plate processing functionality 120 have completed (i.e., the finished or "hardened" flexible plate 220A shown in FIG. 15A is completed). If the answer to the inquiry at decision block 1014 is no, the methodology 1000 returns to the input to decision block 1014. If the answer to the inquiry at decision block 1014 is yes, the methodology 1000 moves to block 1016 and ends.

Figure 11:
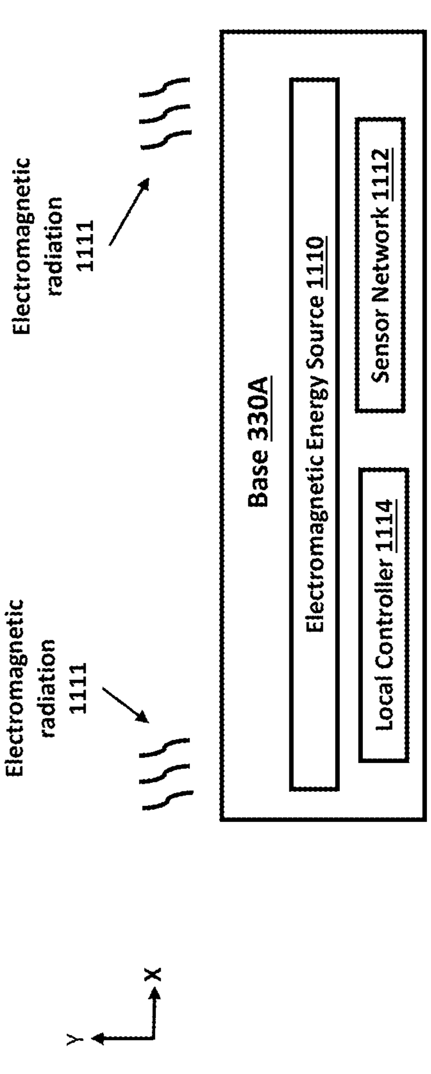
FIG. 11 depicts a simplified block diagram illustrating a 2D representation of a portion of a raw flexible plate in accordance with embodiments of the invention.

FIG. 11 depicts an embodiment of the invention where the need to modify an existing flexographic printing system is minimized or eliminated by providing the raw flexible plate 210A with a local controller, a sensor network, and an electromagnetic energy source. In some embodiments of invention, a local controller 1114, a sensor network 1112, and an electromagnetic energy source 1110 are incorporated within or on the base layer 330, thereby forming the base layer 330A show in FIG. 11. In some embodiments of the invention, the electromagnetic energy source 1110 can be on or above the mask layer 340 and configured to send electromagnetic energy 1111 downward or at an angle through a revealed portion of the top surface of the flexible layer 310. In some embodiments of the invention, a first instance of the electromagnetic energy source 1110 is on or above the mask layer 340, and a second instance of the electromagnetic energy source 1110 is within, on or coupled to the base layer 330A. In some embodiments of the invention, the electromagnetic energy source 630, first instance of the electromagnetic energy source 1110, and the second instance of the electromagnetic energy source 1110 are provided in any combination of one, some or all.

In accordance with embodiments of invention, the electromagnetic energy source 1110 can be implemented as an array of addressable LEDs. The sensor network 1112 can be made operable to detect when the raw flexible plate 210A is within a predetermined range of the adjustable clamping element 610 of the flexographic printing system 110. In response to detecting when the raw flexible plate 210A is within a predetermined range of the adjustable clamping element 610 element, the sensor network 1112 can notify the local controller 1114, which determines and activates the addressable LEDs positioned such that they provide curing UV light (electromagnetic radiation 1111) to the non-print region 420 of the raw flexible plate 210A. In some embodiments of the invention, the local controller 1114 can also, responsive to receiving an notification that the raw flexible plate 210A is within a predetermined range of the adjustable clamping element 610, issue an interrupt or pause or delay command to the controller 140 of the flexographic printing system 110 to interrupt/pause/delay the application of the clamping force 710 to the non-print region 420 of the raw flexible plate 210A in a manner that prevents the clamping force 710 from bulging the edge sidewall 420 of the non-print region 420 before the pre-hardening process applied by the electromagnetic energy source 1110 has sufficiently hardened the non-print region 420. In some embodiments of the invention, the pre-hardening process is applied by the electromagnetic energy source to the non-print region 420 and completed before the clamping force 710 is applied. In some embodiments of the invention, the pre-hardening process applied by the electromagnetic energy source 1110 overlaps with the application of the clamping force 710; and the pre-hardening process raises the RTF of the non-print region to a predetermined level (or within a predetermined range of levels) that is sufficient to substantially prevent the clamping force 710 from bulging the edge sidewall 430 of the non-print region 420. The embodiment of the raw flexible plate 210A having the base layer 330A shown in FIG. 11 is particularly useful in situations where the end user receives the raw flexible plate 210, 210A in larger sheets and cuts the larger sheets into smaller sheets that each has a completely new set of non-print regions. The raw flexible plate 210A shown in FIG. 11 has the ability to use the sensor network 1112 to detect the new set of non-print regions and activate the LEDs of the addressable array of LEDs that corresponds to the new non-print regions to generate pre-hardened versions of the new non-print regions that counter the impact of the clamping force 710. The embodiment of the raw flexible plate 210A having the base layer 330A shown in FIG. 11 is particularly useful and an improvement over situations where a raw flexible plate is manufactured with present hardened non-print regions, which are completely negated where the end user cuts the larger sheets of raw flexible plates into smaller sheets of the raw flexible plates.

Figure 12:
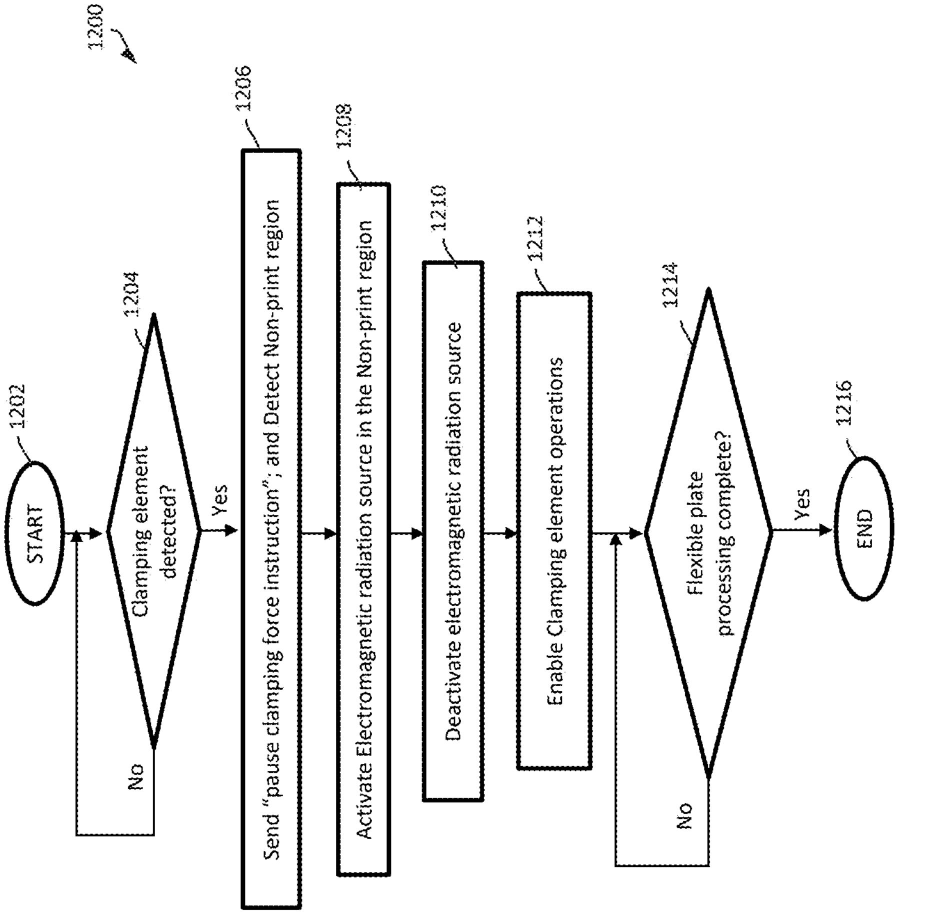
FIG. 12 depicts a flow diagram illustrating a methodology in accordance with embodiments of the invention.

FIG. 12 depicts a methodology 1200 reflecting plate processing operations performed by the plate processing functionality 120 in accordance with embodiments of the invention. The following descriptions of the methodology 1200 make reference to the methodology 1200 shown in FIG. 12, as well as aspects of the raw flexible plate 210, 210A and the flexographic printing system 110 shown in FIGS. 1-9, as modified by FIG. 11, and that implement the methodology 1200. As shown in FIG. 12, the methodology 1200 starts at block 1202 then moves to decision block 1204 where the sensor network 1112 determines whether or not the raw flexible plate 210A has been detected as being within a predetermined distance from the adjustable clamping element 610. If the answer to the inquiry at decision block 1204 is no, the methodology 1200 returns to the input to decision block 1204. If the answer to the inquiry at decision block 1204 is yes, the methodology 1200 moves to block 1206 and the local controller 1114 is operable to, responsive to the sensor network 1112 detecting a proximity of the raw flexible plate 210A to the adjustable clamping element 610, communicated with the controller 140 to having the controller send a "pause clamping force instruction" to the adjustable clamping element 610, which prevents, interrupts, and/or pauses any clamping operation provided by the adjustable clamping element 610. The methodology 1200 moves to block 1208 and activates the electromagnetic energy source 1110 to provide electromagnetic radiation 810 through the edge sidewall 430 to the non-print region 420, thereby creating the pre-hardened non-print region 420A. After waiting a predetermined period of time to allow the pre-hardened non-print region 420A to form, the methodology 1200 moves to block 1210 and the local controller 1114 communicates with the controller 140 to deactivate the electromagnetic energy source 1110 to stop providing electromagnetic radiation through the edge sidewall 430. In some embodiments of the invention, the electromagnetic energy source 1110 is activated for a predetermined time then times out, which would make the operation at block 1210 unnecessary. The methodology 1200 moves to block 1212 and enables clamping element operations that allow the adjustable clamping element 610 to move into place over the non-print region 420 and apply the clamping force 710. The methodology 1200 moves to decision block 1214 and determines through the local controller 1114 communicating with the controller 140 whether or not plate processing operations of the plate processing functionality 120 have completed (i.e., the finished or "hardened" flexible plate 220A shown in FIG. 15A is completed). If the answer to the inquiry at decision block 1214 is no, the methodology 1200 returns to the input to decision block 1214. If the answer to the inquiry at decision block 1214 is yes, the methodology 1200 moves to block 1216 and ends.

Figure 13:
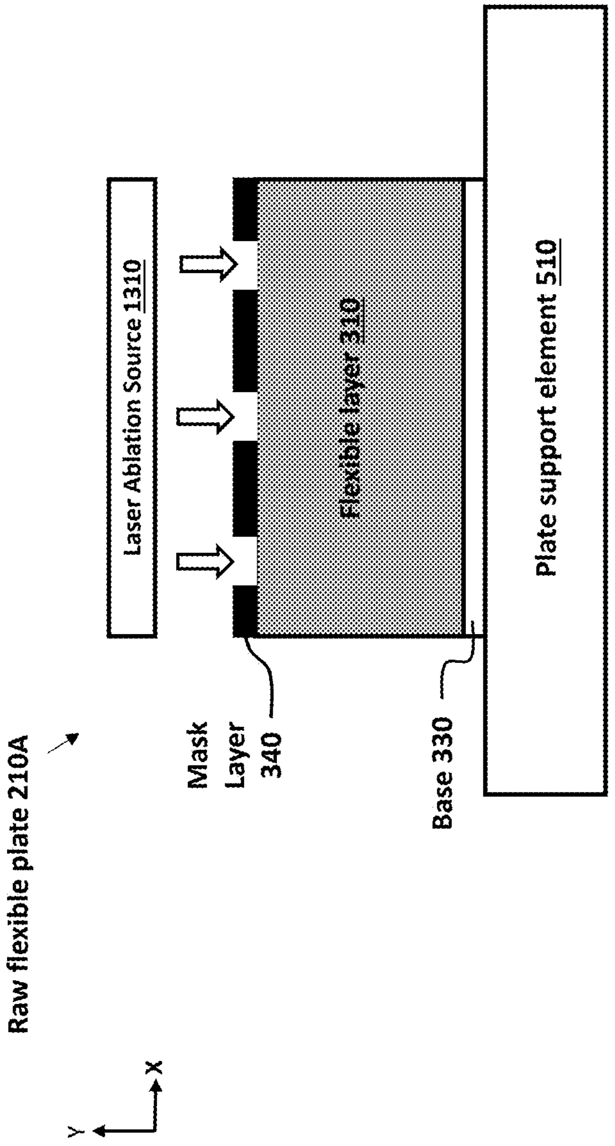
FIG. 13 depicts a simplified block diagram illustrating a 2D representation of a raw flexible plate during plate processing operations in accordance with embodiments of the invention.

As shown in FIG. 13, known fabrication operations have been used to place the raw flexible plate 210A under a laser ablation source 1310. Under control of the controller 140, the laser ablation source 1310 ablates selected portions of the mask layer 340 to define a printing pattern. For ease of illustration, the adjustable clamping element 610 that holds the raw flexible plate 210A in place is not depicted.

As shown in FIG. 14, known fabrication operations have been used to place the raw flexible plate 210A between electromagnetic radiation sources 1410, 1420, respectively. Under control of the controller 140, the electromagnetic radiation sources 1410, 1420 cure or harden a bottom region of the flexible layer 310, along with selected portions of a top region of the flexible layer 310. For ease of illustration, the adjustable clamping element 610 that holds the raw flexible plate 210A in place is not depicted.

As shown in FIG. 15A, known fabrication operations have been bene used to remove remaining portions of the mask layer 340, and further remove the uncured regions of the flexible layer 310 from the top region of the flexible layer 310, thereby forming the finished or hardened flexible plate 220A. For ease of illustration, the adjustable clamping element 610 that holds the raw flexible plate 210A in place is not depicted.

As shown in FIG. 15B, the finished or hardened flexible plate 220A is used by the printing functionality 130 of the flexographic printing system 110 to perform printing operations. Ink 1510 is provided on upper patterned surface of the hardened flexible layer 310A, and a pressure cylinder 1530 rolls a printing substrate 1520 over the hardened flexible layer 310A to transfer or print the print pattern defined by the upper patterned surface to the printing surface 1520.

Figure 16:
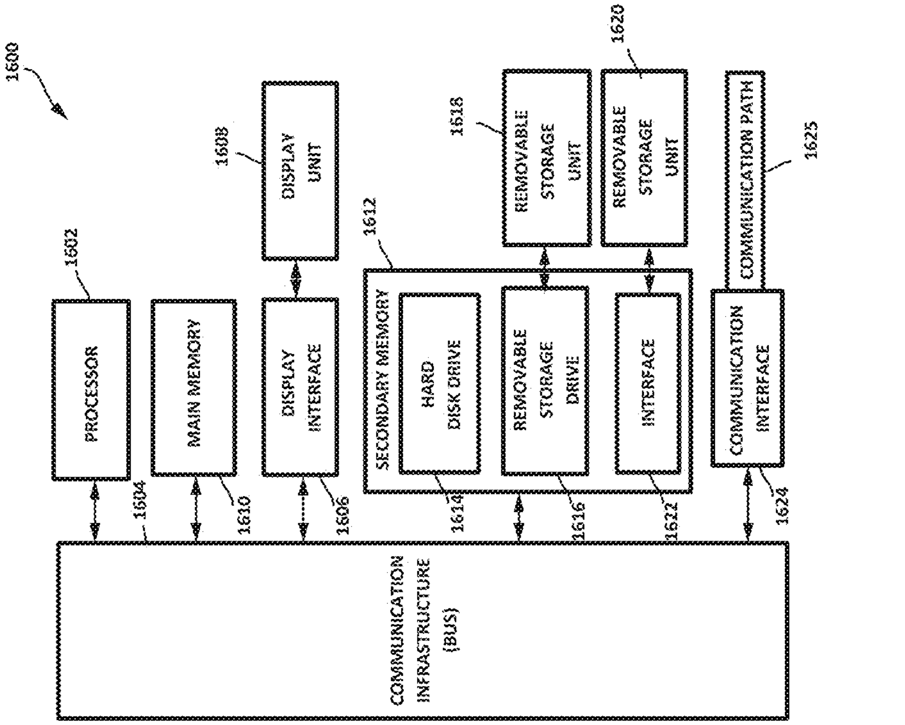
FIG. 16 depicts details of an exemplary computing system capable of implementing various aspects of the invention.

FIG. 16 depicts a high level block diagram of the computer system 1600, which can be used to implement one or more computer processing operations in accordance with aspects of the invention. Although one exemplary computer system 1600 is shown, computer system 1600 includes a communication path 1626, which connects computer system 1600 to additional systems (not depicted) and can include one or more wide area networks (WANs) and/or local area networks (LANs) such as the Internet, intranet(s), and/or wireless communication network(s). Computer system 1600 and additional system are in communication via communication path 1626, e.g., to communicate data between them.

Computer system 1600 includes one or more processors, such as processor 1602. Processor 1602 is connected to a communication infrastructure 1604 (e.g., a communications bus, cross-over bar, or network). Computer system 1600 can include a display interface 1606 that forwards graphics, text, and other data from communication infrastructure 1604 (or from a frame buffer not shown) for display on a display unit 1608. Computer system 1600 also includes a main memory 1610, preferably random access memory (RAM), and can also include a secondary memory 1612. Secondary memory 1612 can include, for example, a hard disk drive 1614 and/or a removable storage drive 1616, representing, for example, a floppy disk drive, a magnetic tape drive, or an optical disk drive. Removable storage drive 1616 reads from and/or writes to a removable storage unit 1618 in a manner well known to those having ordinary skill in the art. Removable storage unit 1618 represents, for example, a floppy disk, a compact disc, a magnetic tape, or an optical disk, flash drive, solid state memory, etc. which is read by and written to by removable storage drive 1616. As will be appreciated, removable storage unit 1618 includes a computer readable medium having stored therein computer software and/or data.

In alternative embodiments, secondary memory 1612 can include other similar means for allowing computer programs or other instructions to be loaded into the computer system. Such means can include, for example, a removable storage unit 1620 and an interface 1622. Examples of such means can include a program package and package interface (such as that found in video game devices), a removable memory chip (such as an EPROM, or PROM) and associated socket, and other removable storage units 1620 and interfaces 1622 which allow software and data to be transferred from the removable storage unit 1620 to computer system 1600.

Computer system 1600 can also include a communications interface 1624. Communications interface 1624 allows software and data to be transferred between the computer system and external devices. Examples of communications interface 1624 can include a modem, a network interface (such as an Ethernet card), a communications port, or a PCM-CIA slot and card, etcetera. Software and data transferred via communications interface 1624 are in the form of signals which can be, for example, electronic, electromagnetic, optical, or other signals capable of being received by communications interface 1624. These signals are provided to communications interface 1624 via communication path (i.e., channel) 1626. Communication path 1626 carries signals and can be implemented using wire or cable, fiber optics, a phone line, a cellular phone link, an RF link, and/or other communications channels.

In the present description, the terms "computer program medium," "computer usable medium," "computer program product," and "computer readable medium" are used to generally refer to media such as main memory 1610 and secondary memory 1612, removable storage drive 1616, and a hard disk installed in hard disk drive 1614. Computer programs (also called computer control logic) are stored in main memory 1610 and/or secondary memory 1612. Computer programs can also be received via communications interface 1624. Such computer programs, when run, enable the computer system to perform the features of the invention as discussed herein. In particular, the computer programs, when run, enable processor 1602 to perform the features of the computer system. Accordingly, such computer programs represent controllers of the computer system.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Many of the functional units described in this specification have been labeled as modules. Embodiments of the invention apply to a wide variety of module implementations. For example, a module can be implemented as a hardware circuit comprising custom VLSI circuits or gate arrays, off-the-shelf semiconductors such as logic chips, transistors, or other discrete components. A module can also be implemented in programmable hardware devices such as field programmable gate arrays, programmable array logic, programmable logic devices or the like.

Modules can also be implemented in software for execution by various types of processors. An identified module of executable code can, for instance, include one or more physical or logical blocks of computer instructions which can, for instance, be organized as an object, procedure, or function. Nevertheless, the executables of an identified module need not be physically located together, but can include disparate instructions stored in different locations which, when joined logically together, comprise the module and achieve the stated purpose for the module.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, a process, a method, an article, or an apparatus that comprises a list of elements is not necessarily limited to only those elements but can include other elements not expressly listed or inherent to such composition, mixture, process, method, article, or apparatus.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Additionally, the term "exemplary" and variations thereof are used herein to mean "serving as an example, instance or illustration." Any embodiment or design described herein as "exemplary" is not necessarily to be construed as preferred or advantageous over other embodiments or designs. The terms "at least one," "one or more," and variations thereof, can include any integer number greater than or equal to one, i.e. one, two, three, four, etc. The terms "a plurality" and variations thereof can include any integer number greater than or equal to two, i.e., two, three, four, five, etc. The term "connection" and variations thereof can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The phrases "in communication with," "communicatively coupled to," and variations thereof can be used interchangeably herein and can refer to any coupling, connection, or interaction using electrical signals to exchange information or data, using any system, hardware, software, protocol, or format, regardless of whether the exchange occurs wirelessly or over a wired connection.

Aspects of the invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the invention. In this regard, each block in the flowchart or block diagrams may represent a module, segment, or portion of instructions, which comprises one or more executable instructions for implementing the specified logical function (s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It will be understood that those skilled in the art, both now and in the future, may make various improvements and enhancements which fall within the scope of the claims which follow.

What is claimed is:

1. A component of a flexographic printing system, the component comprising:

an electromagnetic energy source configured to electronically couple to a controller;

wherein the electromagnetic energy source is further configured to apply a pre-hardening process to at least one selected regions of a raw flexible plate, the raw flexible plate comprising one or more print regions and one or more non-print regions;

wherein the one or more print regions comprise one or more non-sacrificial regions of the raw flexible plate reserved for forming, through downstream plate processing, a hardened flexible plate;

wherein the one or more non-print regions further comprise one or more sacrificial regions of the raw flexible plate not reserved for forming, through the downstream plate processing, the hardened flexible plate;

wherein the one or more sacrificial regions comprise a first non-print region;

wherein the electromagnetic energy source is further configured to apply the pre-hardening process to the first non-print region;

wherein applying the pre-hardening process to the first non-print region results in a pre-hardened region of the first non-print region of the raw flexible plate; and wherein the pre-hardened region of the first non-print region of the raw flexible plate counters a clamping force applied to the first non-print region of the raw flexible plate during the pre-hardening process.

2. The component of claim 1, wherein the pre-hardening process converts at least a portion of the first non-print region to a pre-hardened first non-print region.

3. The component of claim 2, wherein the pre-hardening process converts the at least a portion of the first non-print region to the pre-hardened first non-print region without substantially changing the one or more print regions of the raw flexible plate.

4. The component of claim 2, wherein the pre-hardened first non-print region comprises an exposed edge sidewall.

5. The component of claim 4, wherein the clamping force is insufficient to cause the exposed edge sidewall of the pre-hardened first non-print region to substantially bulge.

6. The component of claim 2, wherein the one or more print regions comprises a photopolymer material.

7. The component of claim 6, wherein the one or more non-print regions comprise the photopolymer material.

8. The component of claim 7, wherein the pre-hardening process comprises a curing process.

9. The component of claim 8, wherein the curing process comprises an ultraviolet (UV) electromagnetic radiation curing process.

10. A flexible plate comprising:

one or more print regions;

one or more non-print regions comprising a first non-print region having an exposed edge sidewall;

wherein the one or more print regions comprise one or more non-sacrificial regions of the flexible plate reserved for forming, through downstream plate processing, a hardened flexible plate;

wherein the one or more non-print regions further comprise one or more sacrificial regions of the flexible plate not reserved for forming, through the downstream plate processing, the hardened flexible plate; and an electromagnetic energy source configured to, responsive to instructions from a controller, convert at least a portion of the first non-print region to a pre-hardened first non-print region by applying a pre-hardening process to the exposed edge sidewall.

11. The flexible plate of claim 10, wherein:

the one or more print regions comprise a photopolymer material; and the one or more non-print regions comprise the photopolymer material.

12. The flexible plate of claim 11, wherein:

the electromagnetic energy comprises ultraviolet (UV) light; and the pre-hardening process comprises activating the UV light energy source.

13. A method of forming a component of a flexographic printing system, the method comprising:

providing an electromagnetic energy source configured to electronically couple to a controller;

wherein the electromagnetic energy source is further configured to apply a pre-hardening process to at least one selected regions of a raw flexible plate, the raw flexible plate comprising one or more print regions and one or more non-print regions;

wherein the one or more print regions comprise one or more non-sacrificial regions of the raw flexible plate reserved for forming, through downstream plate processing, a hardened flexible plate;

wherein the one or more non-print regions further comprise one or more sacrificial regions of the raw flexible plate not reserved for forming, through the downstream plate processing, the hardened flexible plate;

wherein the one or more sacrificial regions comprise a first non-print region;

wherein the electromagnetic energy source is further configured to apply the pre-hardening process to the first non-print region;

wherein applying the pre-hardening process to the first non-print region results in a pre-hardened region of the first non-print region of the raw flexible plate; and wherein the pre-hardened region of the first non-print region of the raw flexible plate counters a clamping force applied to the first non-print region of the raw flexible plate during the pre-hardening process.

14. The method of claim 13, wherein the pre-hardening process converts at least a portion of the first non-print region to a pre-hardened first non-print region.

15. The method of claim 14, wherein the pre-hardening process converts the at least a portion of the first non-print region to the pre-hardened first non-print region without substantially changing the one or more print regions of the raw flexible plate.

16. The method of claim 14, wherein the pre-hardened first non-print region comprises an exposed edge sidewall.

17. The method of claim 16, wherein the clamping force is insufficient to cause the exposed edge sidewall of the pre-hardened first non-print region to substantially bulge.

18. The method of claim 17, wherein:

the one or more print regions comprise a photopolymer material; and the one or more non-print regions comprise the photopolymer material.

19. The method of claim 18, wherein the pre-hardening process comprises a curing process.

20. The method of claim 19, wherein the curing process comprises an ultraviolet (UV) electromagnetic radiation curing process.

* * * * *